United States Patent
Westerman et al.

(10) Patent No.: US 7,629,410 B2
(45) Date of Patent: Dec. 8, 2009

(54) LATEX COMPOSITIONS

(75) Inventors: I. John Westerman, Wadsworth, OH (US); Jaclyn Beth Laurich, Tallmadge, OH (US); Michael Flickinger, Akron, OH (US); Douglas Oblak, Tallmadge, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 307 days.

(21) Appl. No.: 11/352,786

(22) Filed: Feb. 13, 2006

(65) Prior Publication Data

US 2006/0229405 A1 Oct. 12, 2006

Related U.S. Application Data

(60) Provisional application No. 60/652,431, filed on Feb. 11, 2005.

(51) Int. Cl.
*C08L 35/06* (2006.01)

(52) U.S. Cl. .......... 524/539; 524/522; 524/501; 524/559; 524/425; 524/431; 524/423; 526/318.25; 525/221

(58) Field of Classification Search .......... 525/242, 525/221; 524/522, 501, 539, 559, 425, 431, 524/423; 526/318.25
See application file for complete search history.

(56) References Cited

U.S. PATENT DOCUMENTS

| | | | | |
|---|---|---|---|---|
| 4,567,099 A | | 1/1986 | Van Gilder | 428/327 |
| 5,726,259 A | | 3/1998 | Hayes | 526/80 |
| 6,818,697 B2 | * | 11/2004 | Zhang et al. | 524/560 |
| 6,992,121 B1 | * | 1/2006 | Peters et al. | 523/206 |

FOREIGN PATENT DOCUMENTS

WO  01/38412 A1 *  5/2001

* cited by examiner

*Primary Examiner*—Margaret G Moore
(74) *Attorney, Agent, or Firm*—Arthur M. Reginelli

(57) ABSTRACT

A latex composition having a polymodal particle size distribution. The latex composition is useful in paper coatings.

21 Claims, 1 Drawing Sheet

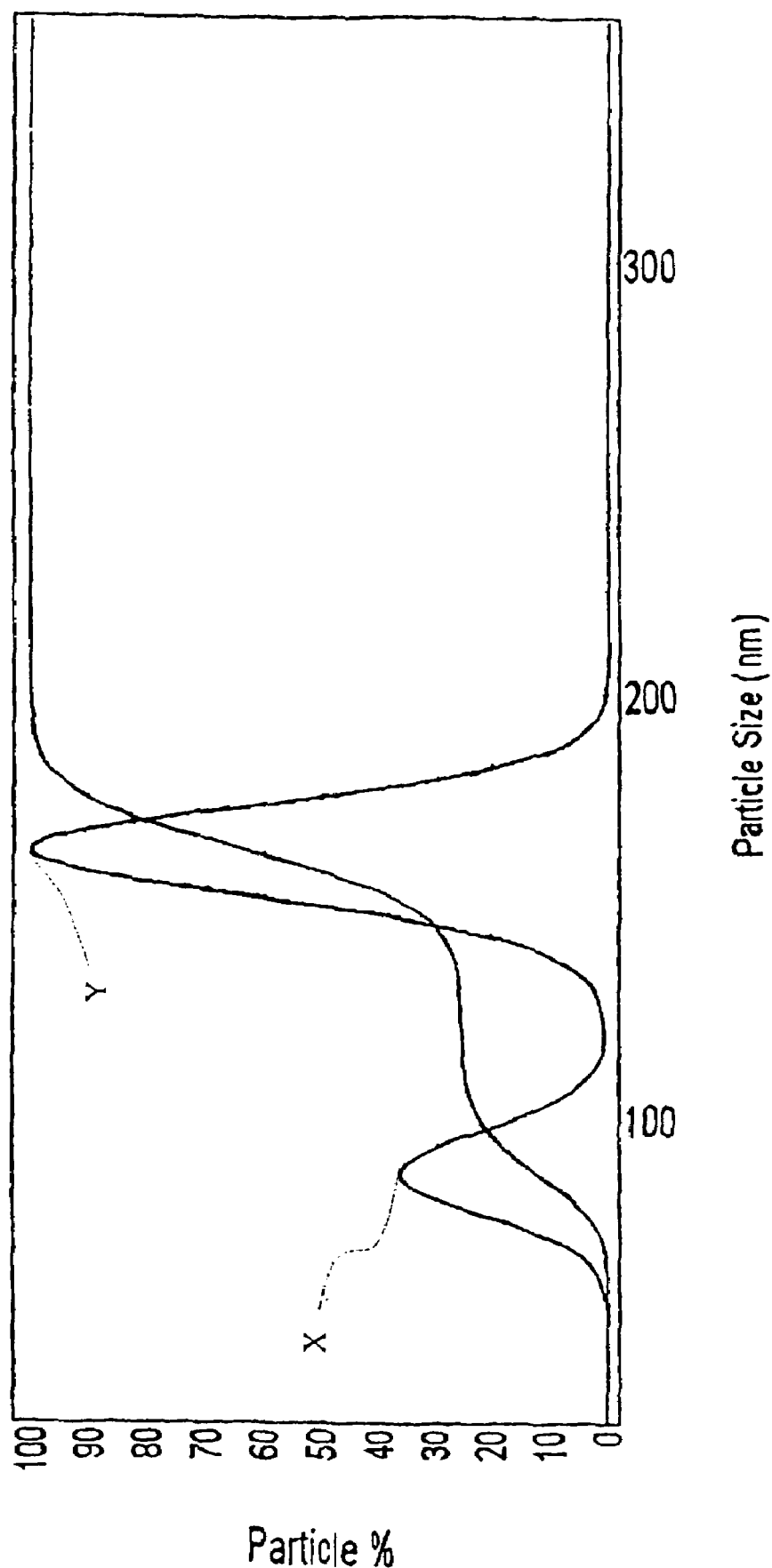

LATEX COMPOSITIONS

This application claims the benefit of U.S. Provisional Application No. 60/652,431, filed Feb. 11, 2005, which is incorporated herein by reference.

FIELD OF THE INVENTION

This invention relates to latex compositions having a polymodal particle size distribution. The latex compositions are useful in paper coatings.

BACKGROUND OF THE INVENTION

Paper coating lattices, such as styrene-butadiene emulsion polymers, are typically added to bind inorganic pigments together in order to make a paper surface smooth and uniform for printing. Coating strength, gloss, blister resistance, smoothness and print mottle are all key characteristics of coated paper and can be impacted by the latex composition. Prior attempts to improve one of these characteristics have generally resulted in compromising other characteristics. There is a need for a latex composition that provides a balance of properties.

BRIEF DESCRIPTION OF THE DRAWINGS

FIG. 1 is a plot of a bimodal particle size distribution, measured by capillary hydrodynamic fractionation, where the particle size is plotted versus number of particles.

SUMMARY OF THE INVENTION

In general the present invention provides a latex comprising a plurality of polymeric particles, where the particles include from about 50 to about 90 weight percent of particle population A and from about 10 to about 50 weight percent of particle population B, based upon the total weight of particles, where the particles of population A have a particle size of greater than 120 nanometers, and the particles of population B have a particle size of less than 120 nanometers, where at least some of the polymer particles contain acid functionality, and where the milliequivalents of acid functionality per 100 grams of population B is greater than the milliequivalents of acid functionality per 100 grams of population A.

The present invention further provides a binder composition for paper coatings, the binder comprising a latex, the latex including a plurality of polymeric particles, where the particles include from about 50 to about 90 weight percent of particle population A and from about 10 to about 50 weight percent of particle population B, based upon the total weight of particles, where the particles of population A have a particle size of greater than 120 nanometers, and the particles of population B have a particle size of less than 120 nanometers, where at least some of the polymer particles contain acid functionality, and where the milliequivalents of acid functionality per 100 grams of population B is greater than the milliequivalents of acid functionality per 100 grams of population A.

The present invention also provides a process for forming a polymodal distribution of particles within a latex, the process comprising the steps of combining a first set of one or more aqueous emulsion polymerizable monomers, an initiator, a surfactant, a chain transfer agent, and optionally a chelating agent, where the first set of one or more aqueous emulsion polymerizable monomers includes at least one acid-bearing monomer, polymerizing the monomers to form a first aqueous mixture containing particle population A, adding to the first aqueous mixture a second set of one or more aqueous emulsion polymerizable monomers, a surfactant, an initiator, a chain transfer agent, and optionally a chelating agent, where the second set of aqueous polymerizable monomers includes an acid-bearing monomer, and where the percent by weight of acid-bearing monomer in the first set, based upon the total weight of monomer in the first set, is less than the percent by weight of acid-bearing monomer in the second set, based upon the total weight of monomer in the second set, and polymerizing the second set of monomers to form particle population B.

The present invention further includes a process for forming a polymodal distribution of particles within a latex, the process comprising the steps of combining an acid-bearing monomer, a conjugated diene monomer, an alkenyl aromatic monomer, an initiator, a surfactant, a chain-transfer agent, and optionally a chelating agent, to form a first aqueous mixture containing a first particle population, the first particle population having a first particle size distribution, combining an acid-bearing monomer, a conjugated diene monomer, an alkenyl aromatic monomer, an initiator, a surfactant, a chain-transfer agent, and optionally a chelating agent, to form a second aqueous mixture containing a second particle population, the second particle population having a second particle size distribution, and combining the first aqueous mixture and the second aqueous mixture, where the monomers combined to form the first aqueous mixture and the monomers combined to form the second aqueous mixture may be the same or different, and where the percent by weight of acid-bearing monomer in the first aqueous mixture, based upon the total weight of monomer in the first mixture, is different from the percent by weight of acid-bearing monomer in the second aqueous mixture, based upon the total weight of monomer in the second mixture.

DETAILED DESCRIPTION OF ILLUSTRATIVE EMBODIMENTS

The latex composition of the present invention contains at least two particle populations. The first population, which may be designated population A, can be distinguished from the second population, which may be designated population B, based upon particle size and acid content.

In one or more embodiments, the diameter of the particles of population A are greater than 120 nanometers (nm), and the diameter of the particles of population B are less than 120 nm. In certain embodiments, the particles of particle population A can be characterized by a particle size distribution of from about 120 to about 200 nm, optionally from about 145 to about 190 nm, and optionally from about 150 to about 175 nm. Likewise, in certain embodiments, the particles of particle population B can be characterized by a particle size distribution of from about 30 to about 120 nm, optionally from about 60 to about 110 nm, and optionally from about 70 to about 90 nm in diameter.

In one or more embodiments, the latex of the present invention includes a polymodal particle size distribution. As one of skill in the art will appreciate, the particle size distribution of a polymodal material exhibits at least two maxima when the diameter of the particles is plotted versus the number of particles having that diameter. The diameters at which the maxima are observed are referred to as modal diameters, or nominal size. For example, FIG. 1 shows a plot of a bimodal particle size distribution, measured by capillary hydrodynamic fractionation, where the particle size is plotted versus number of particles. One peak maximum, designated generally by the letter X, occurs at about 85 nm (i.e. particles that would be included in particle population B). A second peak maximum, designated generally by the letter Y, occurs at about 161.2 nm (i.e. particles that would be included in particle population A). In this example, the modal diameter of particle population B would be about 85 nm, and the modal diameter of particle population A would be about 161.2 nm.

In one or more embodiments, particle population A is characterized by including a modal diameter of from about 120 to about 200 nm, optionally from about 140 to about 190 nm, optionally from about 145 to about 180, and optionally from about 150 to about 175 nm.

In these or other embodiments, particle population B is characterized by including a modal diameter of from about 50 to about 115, optionally from about 60 to about 110 nm, optionally from about 65 to about 100, and optionally from about 70 to about 90 nm in diameter.

In certain embodiments, the distribution of particle sizes for particles that are greater than 120 nm in diameter can be represented by a normal gaussian distribution. Likewise, the distribution of particle sizes for particles that are less than 120 nm in diameter can be represented by a normal gaussian distribution. In these or other embodiments, the majority of the particles within each population will fall within about ±15 nm of the modal diameter. As is known in the art of emulsions, a small number of particles may aggregate to form larger sized particles, and this may slightly distort the normal distribution curve. In some embodiments, the aggregates may appear as a separate gaussian distribution with a distinct modal diameter.

Unless otherwise specified, the diameters of the latex particles, i.e. particle size, were determined by capillary hydrodynamic fractionation (CHDF). The particle size analyzer employed was provided by Matec Applied Sciences, Northborough, Mass. CHDF is a chromatographic method in which particles elute at different times from a narrow-bore capillary column, depending upon the latex size. Those skilled in the art appreciate that particle size data generated from methods employing different physical principles cannot always be directly correlated due to factors such as the density, shape, and optical properties of the particles within the latex, yet they can be correlated by using principles known in the art.

The particles of population A, which are the larger particles, can also be distinguished from the particles of population B, which are the smaller particles, based upon acid content.

While acid content is generally a quantitative measure relating to the number of carboxylic acid groups or moieties associated with (e.g. pendant to and covalently bonded to) a polymer chain, the term acid content can, without additional detail, refer to several measurements. For example, the term acid content may refer to the number of carboxylic acid groups on a mole or equivalent basis. As those skilled in the art appreciate, FTIR analysis can be used to determine these quantitative values. Or, the term may refer to the weight or percentage of acid-bearing mer units in the polymer. Further, the term may refer to the weight or percentage of acid-bearing monomer employed in the synthesis of the polymer. Where the term acid content is used herein without further specificity, the term refers to the milliequivalents (meq) of carboxylic acid per 100 grams of dry polymer.

In one or more embodiments, the total acid content of the polymodal latex is from about 25 to about 135 meq of carboxylic acid per 100 grams dry polymer, optionally from about 45 to about 100 meq of carboxylic acid per 100 grams dry polymer, optionally from about 50 to about 80 meq of carboxylic acid per 100 grams dry polymer. In these or other embodiments, the milliequivalents of acid functionality per 100 grams of population B is greater than the milliequivalents of acid functionality per 100 grams of population A.

While there may be several meanings of acid content, reference to acid content as a ratio between the population A and population B generally normalizes any differences that may exist. In one embodiment, the ratio of the acid content of population A to population B is at least 1:1.5, optionally from about 1:1.5 to about 1:10, optionally from about 1:2 to about 1:8, optionally from about 1:3 to about 1:5, and optionally from about 1:1.7 to about 1:3.

Besides the foregoing characteristics, the particles of population A and population B are compositionally similar to those latex particles employed in conventional paper coating compositions. As between population A and population B, the particles may be compositionally similar or dissimilar.

In one embodiment, the polymer particles derive from copolymerization of aliphatic conjugated diene monomer, polymerizable acid-bearing monomer, alkenyl aromatic monomer, and optionally ethylenically unsaturated monomer including esters, amides, and nitriles.

Aliphatic conjugated diene monomers include those having from about 4 to about 8 carbon atoms or optionally from about 4 to about 6 carbon atoms. Examples of diene monomers include piperylene, isoprene, 2,3-dimethyl-1,3-butadiene, 1,3-butadiene, or mixtures thereof. Mixtures of two or more conjugated dienes may also be used. In one embodiment, the aliphatic conjugated diene monomers are used in amount of about 5 to 60 parts by weight, optionally 15 to 50 parts by weight, per 100 parts by weight of the total amount of monomers added (i.e. employed as ingredients in the synthesis of the polymer particles of populations A and B). The amount of aliphatic conjugated diene monomer employed in the synthesis of the particles of population A may be the same or different than the amount of aliphatic conjugated diene monomer employed in the synthesis of the particles of population B.

Examples of acid-bearing monomers include ethylenically unsaturated carboxylic acid monomers such as acrylic acid, methacrylic acid, fumaric acid, crotonic acid, maleic acid, itaconic acid, 2-acrylamido-2-methylbutanoic acid, and the like, and combinations of two or more such acids. In one or more embodiments, both acrylic acid and itaconic acid are employed. In one embodiment, the carboxylic acid monomer is used in amounts of about 0.5 to about 25 parts by weight per 100 parts by weight of the total amount of monomers added, optionally about 2 to about 10 parts by weight per 100 parts by weight of the total amount of monomers added, optionally about 3 to about 8 parts by weight per 100 parts by weight of the total amount of monomers added, optionally about 4 to about 6 parts by weight per 100 parts by weight of the total amount of monomers added.

Alkenyl aromatic monomers include compounds having from about 8 to about 12 total carbon atoms. Examples of alkenyl aromatic compounds include styrene, α-methyl styrene, p-tertiary butyl styrene, methyl vinyl toluene, p-vinyl toluene, divinyl benzene, and 3-ethyl styrene, or mixtures thereof. In one embodiment, the alkenyl aromatic monomers are used in an amount of about 60 to 95 parts by weight per 100 parts by weight of the total amount of monomers added. The amount of alkenyl aromatic monomer employed in the synthesis of the particles of population A may be the same or different than the amount of alkenyl aromatic monomer employed in the synthesis of the particles of population B.

Examples of ethylenically unsaturated monomers include ester, amide, and nitrile derivatives of ethylenically unsaturated carboxylic acid that are copolymerizable with the aliphatic conjugated diene monomer, acid-bearing monomer, and alkenyl aromatic monomer.

Examples of amides of ethylenically unsaturated carboxylic acid include various unsaturated amides or derivatives thereof having a total of from about 3 to about 12 carbon atoms. Examples of unsaturated amides or derivatives thereof include acrylamide, methacrylamide, N,N-methylenebisacrylamide, N-methylolacrylamide, N-methylolmethacrylamide, N-ethyoxymethylacrylamide, N-butoxymethylacrylamide, N-isobutoxymethylacrylamide, N,N-dimethylacrylamide, derivatives thereof, and mixtures thereof. In one embodiment, the amount of amide monomer is from about 0.1 to about 5 parts by weight per 100 parts by weight of the total amount of monomers added. The amount of amide monomer employed in the synthesis of the particles of population A may be the same or different than the amount of amide monomer employed in the synthesis of the particles of population B.

Examples of esters of ethylenically unsaturated carboxylic acid include alkyl (meth)acrylates and hydroxyl derivatives thereof, wherein the alkyl portion has from 1 to 10, optionally from 1 to 4 carbon atoms. Examples of ester derivatives include hydroxyethyl acrylate, hydroxyethyl methacrylate, hydroxymethyl acrylate, hydroxymethyl methacrylate, hydroxypropyl acrylate, hydroxypropyl methacrylate, 4-hydroxybutyl acrylate, ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, ethylene oxide extended derivatives of ethyleneglycol methacrylate, methylacrylate, methyl methacrylate, butyl acrylate, 2-ethylhexyl acrylate, propyl acrylate, and ethyl acrylate. In one embodiment, the amount of ester monomer is from about 0.1 to about 30 parts by weight per 100 parts by weight of the total amount of monomers added. The amount of ester monomer employed in the synthesis of the particles of population A may be the same or different than the amount of ester monomer employed in the synthesis of the particles of population B.

Examples of nitriles of ethylenically unsaturated carboxylic acid include acrylonitrile and methacrylonitrile. In one embodiment, the nitrile derivative is utilized in an amount of from about 1 to about 25 and optionally from about 5 to about 15 parts by weight per 100 parts by weight of the total amount of monomers added. The amount of nitrile monomer employed in the synthesis of the particles of population A may be the same or different than the amount of nitrile monomer employed in the synthesis of the particles of population B. In certain embodiments, the amount of nitrile monomer employed in the synthesis of the particles of population A is greater than the amount of nitrile monomer employed in the synthesis of the particles of population B.

Other conventional monomers that can optionally be utilized in conventional amounts include various organic salts, for example sodium styrene sulfonate, the alkali, ammonium, and amine salts of 2-acrylamido-2-methylpropanesulfonate, and the 3-sulfopropyl(meth)acrylate salt of sodium or potassium. In some embodiments, these organic salts aid in colloidal stability.

In one or more embodiments, particle population A is formed from monomers including butadiene, styrene, itaconic acid and acrylonitrile, and particle population B is formed from monomers including butadiene, styrene, itaconic acid, acrylic acid, and acrylonitrile.

The amounts of particle population A and particle population B within the latex may vary, but generally may be expressed in terms of the number of particles or the weight of the particles. For example, in FIG. 1 the peak at 85 nm corresponds to about 70 percent of the number of particles, and the peak at 161.2 nm corresponds to about 30 percent of the number of particles. When the quantity of particles is calculated on a weight basis, the peak at 85 nm corresponds to about 25 percent of the weight of all particles, and the peak at 161.2 nm corresponds to about 75 percent of the weight of all particles.

In one or more embodiments, the latex of the present invention includes from about 50 to about 90 weight percent population A particles (i.e. particles having a diameter of greater than 120 nm) and from about 10 to about 50 weight percent population B particles, based upon the total weight of particles. In another embodiment, the latex includes from about 55 to about 85 weight percent population A particles and from about 15 to about 45 weight percent population B particles, and in another embodiment from about 60 to about 80 weight percent population A particles and from about 20 to about 40 weight percent population B particles, based upon the total weight of particles.

In one embodiment, where the amounts are based on the number of particles, the latex includes from about 10 to about 50 percent population A particles and from about 50 to about 90 percent population B particles, in another embodiment from about 15 to about 45 percent population A particles and from about 55 to about 85 percent population B particles, and in another embodiment from about 20 to about 40 percent population A particles and from about 60 to about 80 percent population B particles, based upon the total number of particles.

A latex containing particle population A, and a latex containing particle population B may be prepared separately by employing conventional emulsion polymerization techniques and then blended together. Emulsion polymerization is described in U.S. Pat. Nos. 5,166,259 and 6,425,978, which are incorporated herein by reference. In general, these processes employ the use of a free-radical initiator to initiate the polymerization of monomer in the presence of a surfactant. Polymerization is typically carried out at a temperature of about 45° C. to about 90° C., and optionally from about 55 to about 75° C.

Alternatively, particle population B may be prepared in the presence of particle population A. More specifically, the latex composition may be prepared by employing a semi-continuous addition or incremental polymerization process. Incremental polymerization is described in more detail in U.S. Pat. No. 5,726,259, which is hereby incorporated by reference in its entirety.

Whether semi-continuous addition or incremental polymerization is employed, or separate polymerization followed by blending, ingredients that are typically employed in addition to the monomers described above include initiators, surfactants, chain transfer agents, neutralizing agents, chelating agents, and emulsifiers.

Any of those free-radical emulsion polymerization initiators conventionally employed in the art may be employed in preparing the polymers or emulsion lattices of this invention. Exemplary initiators include ammonium persulfate, sodium persulfate, potassium persulfate, tert-butyl hydroperoxide, and di-tert-butyl cumene. These initiators may be used in conjunction with a reducing agent such as iron salts, amines, ascorbic acids, sodium salts of ascorbates, sodium formaldehyde sulfoxylates, sodium hydrosulfite, sodium thiosulfate, sodium metabisulfite, sodium salts of substituted sulfur-oxy acetic acids, and mixtures thereof. Conventional amounts of initiator and reducing agent can be used in preparing the lattices of this invention. In one embodiment, about 0.05 to about 2.5, and optionally from about 0.1 to about to about 2.0 parts by weight initiator per 100 parts by weight monomer is used.

The latex composition may include a surfactant. In one embodiment, the surfactant includes an alkali metal salt of an alkyl sulfosuccinate. Examples of alkali salts of alkyl sulfosuccinates include sodium dihexyl sulfosuccinate, sodium dioctyl sulfosuccinate, sodium octane sulfonate, alkyl phenol ethoxylates, fatty alcohol ethoxylates, alkyl polyglucosides, alkyl phosphates, and mixtures thereof.

In another embodiment, the surfactant includes salts of alkyl sulfates, salts of organo disulfonates. Examples of salts of alkyl sulfates include sodium lauryl sulfate, which is available under the tradename Stepanol Wash. Examples of salts of organo disulfonates include sodium dodecyl diphenyloxide disulfonate, which is available under the tradename Dowfax™ 2A1. Other Examples of surfactants include sodium laureth sulfate, Laureth-3 (triethylene glycol dodecyl ether), Laureth-4 (PEG-4 lauryl ether), Laureth-5 (PEG-5 lauryl ether), Laureth-6 (PEG-6 lauryl ether), Laureth-7 (PEG-7 lauryl ether), sodium lauryl ether sulfate, sodium laureth-12 sulfate (PEG (12) lauryl ether sulfate, and sodium laureth-30 sulfate (PEG (30) lauryl ether sulfate).

In yet another embodiment, especially where the latex is foamed, the composition may include disodium stearyl sulfosuccinamate, which is available under the tradename Aerosol 18. This surfactant is may be employed in conjunction with one or more of the following other surfactants.

Other examples of surfactants include alkyl sulfates, alkyl sulfosuccinates, alkyl aryl sulfonates, α-olefin sulfonates, fatty or rosin acids salts, NPE, alkyl aryl sulfonates, alkyl phenol ethoxylates, fatty acid alcohol ethoxylates, and mixtures thereof.

The surfactant is typically present in an amount from about 0.1 to about 10% by weight, optionally from about 1 to about 6% by weight, optionally from about 2 to about 4% by weight based upon the total weight of the composition.

In one embodiment, the surfactant includes a blend of sodium dihexyl sulfosuccinate and sodium dioctyl sulfosuccinate. The blend can be adjusted to control or obtain a desired critical micelle concentration. The dihexyl to dioctyl weight ratio can vary from about 0.05:1 to about 1:0.05.

Any of those chain transfer agents conventionally employed in the emulsion polymerization of conjugated diene monomers may be employed in preparing the polymers or lattices of this invention. Exemplary chain transfer agents include, alkyl mercaptans, carbon tetrachloride, carbon tetrabromide, $C_2$-$C_{22}$ n-alkyl alcohols, $C_2$-$C_{22}$ branched alcohols, 2,4-diphenyl-4-methyl-1-pentene, and mixtures thereof. Conventional amounts of the chain transfer agent can be used in synthesizing the latex.

The pH of the latex can be neutralized by the addition of a base such as potassium hydroxide, sodium bicarbonate, potassium carbonate, ammonium hydroxide, sodium hydroxide, organic amines such as triethylamine, triethanolamine, AMP 95, and mixtures thereof.

As those skilled in the art will appreciate, it is conventional to neutralize the latex to a pH of about 4.5 to about 8.0, and optionally from about 5.5 to about 7.5.

The emulsifiers can generally be any surfactant, soap, or the like which are well known in the art and stable at the pH of the bimodal latex in accordance with the present invention. Examples of specific emulsifiers include alkyl sulfates, alkyl sulfosuccinates, alkyl aryl sulfonates, α-olefin sulfonates, fatty or resin acid salts, nonyl or octyl phenol reaction products of ethylene oxide and the like. The alkyl portion of the various emulsifiers generally has from about 8 to about 18 carbon atoms. Examples of specific surfactants include sodium lauryl sulfate, sodium sulfosuccinates such as sodium dimethylamyl sulfosuccinate, sodium dodecyl diphenyloxide disulfonate and the like. The amount of emulsifier present is sufficient to obtain an aqueous emulsion of the monomers. Such an amount is typically from about 0.5 to 3.0 parts by weight per 100 parts by weight of the total amount of monomers added. Other surfactants that may be utilized include those identified in Surface Active Agents, Schwartz and Perry, Vol. I, Interscience Publishers, Inc., New York, 1958; Surface Activity, Moilet, Collie and Black, D. Van Nostrand Company, Inc. New York, 1961; Organic Chemistry, Feiser and Feiser, D. C. Heath and Company, Boston, 1944; and The Merck Index, Seventh Edition, Merck & Co., Inc., Rahway, N.J., 1960, all of which are hereby incorporated by reference.

Chelating agents may also be used during polymerization to tie up various metal impurities as well as to achieve a uniform polymerization. Examples of specific chelating agents include ethylene diamine tetra-acetic acid, nitrilotri-acetic acid, citric acid, and their ammonium, potassium and sodium salts. The amounts of the chelating agents may range from about 0.01 to about 0.2 parts by weight per 100 parts by weight of the total amount of monomers added.

In one embodiment, a semi-continuous polymerization process is employed. In general, a first polymer seed is provided to the reactor, either by addition of a pre-formed seed that may be prepared in an independent step (i.e., external seed), or by in situ formation in the reactor as described hereinbelow for incremental polymerization. A first stream of monomers may be added uniformly over time to the reactor containing the first polymeric seed. After a pre-determined time interval, a second polymeric seed may be either formed in situ or provided as a pre-formed seed. A second stream of monomers may be added uniformly over time. In one embodiment, the second stream of monomers is characterized by a higher acid content than the first stream of monomers.

In another embodiment, incremental polymerization is employed. In general, the incremental polymerization process is begun by combining a first set of one or more polymerizable monomers, surfactant, initiator, chain transfer agent, and optionally chelating agent, to form an aqueous polymerizable mixture. One or more of the materials may be added over a series of one or more stages. The first set of monomers may be polymerized within the aqueous mixture to form particle population A. Subsequently, a second set of one or more polymerizable monomers, surfactant, initiator, and chain transfer agent may be added to the aqueous mixture containing particle population A. One or more of the materials may be added over a series of one or more stages. The second set of monomers may be polymerized to form particle population B.

In the incremental polymerization process, the ingredients may be added neat or in combination with deionized water, and in some embodiments, two or more of the ingredients are pre-mixed.

In one embodiment, the incremental process includes the step of forming an initial polymerizable mixture by combining two or more aqueous emulsion polymerizable monomers, including at least one acid-bearing monomer, an initiator, a surfactant, a chain transfer agent, and optionally a chelating agent. The surfactant is typically added in an amount above the critical micelle concentration. The order of addition may vary. In one embodiment, the monomers, surfactant, and chelating agent are added to a reactor, heated, and then an aqueous mixture of free radical initiator is added. The aqueous reactants are allowed to react to form a first polymeric seed, at a temperature of about 65 to about 77° C.

Subsequently, additional aqueous emulsion polymerizable monomers, a surfactant, an initiator, a chain transfer agent, and optionally a chelating agent, are added to the first polymeric seed. The two or more monomers in the initial polymerizable mixture and the additional monomers may be the same or different. In one or more embodiments, the additional aqueous polymerizable monomers include an acid-bearing monomer.

In one embodiment, the monomers and other components are charged to the reactor at a rate faster than the polymerization rate of the monomers, over one or more separate stages, such that after each charge the mixture is allowed to react within the reactor. The monomers polymerize within the aqueous mixture to form particle population A. In one or more embodiments, the reaction is allowed to proceed to an aqueous mixture having about 29 to 33 percent solids, which is believed to correspond to about 70 to 80 percent conversion of the monomer.

A second polymeric seed may then be formed within the aqueous mixture containing particle population A. in one or more embodiments, this seed can be grown using one or more monomers, including styrene and itaconic acid. This seed can then be used to form a second particle population B, by adding two or more emulsion polymerizable monomers, including at least one acid-bearing monomer, surfactant, initiator, and optionally chelating agent. The order of addition may vary. The surfactant is typically added above the critical micelle concentration.

In certain embodiments, aqueous emulsion polymerizable monomers, chain transfer agent and surfactant are charged to the reaction zone of the reactor in stages. These staged monomers may be the same or different from the monomers employed to form the second polymeric seed. For example, the second seed may be initially formed by combining an initiator, a surfactant, and an aqueous polymerizable monomer, and the acid-bearing monomer may be added in subsequent stages. The emulsion polymerizable monomers are reacted within the aqueous mixture to form particle population B. At constant percent solids content, the monomer conversion is believed to be approximately 98%.

At this point, the aqueous mixture can be characterized as a latex containing particle population A and particle population B. Additional seeding stages can be utilized if additional particle populations are desired.

Optionally, components including an initiator, defoamer, and sodium hydroxide may be added to the latex. Subsequently, the latex may be stripped until the residual alkenyl aromatic monomer is about 0.05% or less. After stripping, a biocide may be added, as is known in the art.

To some extent, the particle size of the particle populations will depend upon the amount of surfactant employed. For example, increasing the amount of surfactant added during a seeding stage can result in the formation of a greater number of particles and can also result in particles of smaller size. In certain embodiments of the present invention, the amount of surfactant added during the first seed formation is different from the amount of surfactant added during the second formation. This results in a bimodal mixture containing two distinct particle populations that differ in modal diameter and in the number of particles in the population. In one or more embodiments, the amount of surfactant used during the second seed formation, i.e. particle population B, is greater than the amount used during the first seed formation, i.e. particle population A, resulting in the particles of population B being greater in number and smaller in size, relative to the particles of population A.

Advantageously, the amount of acid content of the particles of population A can be controlled by selecting the amount of acid bearing monomer added to the reactor during the first seed and/or the subsequent stages of polymerization of particle population A. Likewise, the amount of acid content of the particles of population B can be controlled by selecting the amount of acid bearing monomer added to the reactor during the second seed and/or the subsequent stages of polymerization of particle population B. In certain embodiments, a relatively greater amount of acid-bearing monomer is added to the reactor during the formation of particle population B than particle population A.

Polymerization is generally carried out from about 48° C. to 94° C., and optionally from about 54° C. to 77° C. Polymerization is generally conducted in an acidic medium when acidic monomers are used and the pH of the latex binder is generally from about 1.0 to 6.5, optionally from about 1.5 to 4.0 and optionally from about 1.5 to 3.0.

In one embodiment, the latex may be prepared by employing controlled conversion techniques such as by adjusting the temperature, the rate of monomer addition, and/or the amount of crosslinking.

It will be appreciated that by controlling the gel fraction of the bimodal latex, a variety of coating formulations may be made for varying paper coating applications and conditions. The gel fraction is believed to be an indication of the extent of cross-linking present between polymer chains in the final structure of the polymer film. The amount of gel fraction may be controlled by various methods, such as the controlled addition of a chain-transfer agent, particularly when the chain transfer agent includes a branched $C_{12}$ alkyl mercaptan. The gel fraction of a latex composition may be determined as the percentage of dried polymer that is insoluble in a specific solvent after 8 hours immersion. In one or more embodiments, the bimodal latex of the present invention contains a controlled gel fraction of about 30 to 90 wt % that is insoluble in toluene at 20° C. Optionally, the bimodal latex contains a controlled gel fraction of about 50 to 80 wt %. In some embodiments, a bimodal latex coating having a gel fraction of about 30 to 60 wt % provides good porosity and rate of ink tack buildup (sometimes referred to as slope). By increasing the gel fraction to about 70 to 80 wt % it is often possible to reduce porosity and lower the slope.

The amount of solids in the bimodal latex is generally from about 40 to about 60, optionally from about 45 to about 55 wt %, optionally about 50 wt %, based upon the total weight of the bimodal latex and the remaining ingredients, e.g., water.

In certain embodiments, the bimodal latex of this invention is employed in a coating formulation, where the coating formulation also includes an amount of a finely divided mineral filler. Exemplary mineral fillers include kaolin clay, satin white, calcium carbonate, and titanium oxide. The amount of filler employed in the coating formulation can vary, depending upon the density of the filler and the coating properties desired. Typically, coating formulations include latex particles in an amount of from about 2 to about 25, optionally from about 8 to about 16 parts by weight of bimodal latex per 100 parts of filler. In one or more embodiments, the coating formulation includes from about 40 to about 70 percent solids by weight, optionally from about 55 to about 68 percent solids by weight. The coating formulation may optionally further include one or more co-binders (e.g., starch, casein, protein, polyacrylate, polyvinyl alcohol), thickeners, cross-linking agents, stabilizers, anti-foaming agents, surfactants, and water retention aids.

The coating formulations may be applied to a paper sheet via a conventional coating device. Exemplary methods of applying a latex coating to the paper include blade coaters, air knife coaters, rod coaters, roll coaters, and the like. For a more detailed discussion of various coating devices reference is made to U.S. Pat. No. 4,474,860, and Coating Equipment and Processes, O. L. Booth, Lockwood Publishing Co., Inc., 1970, both of which are hereby incorporated by reference.

In some embodiments, the coating formulations of the present invention exhibit improved coating strength, as evidenced by wet pick and dry pick tests and P&I Stability test. In addition, the coating formulations often exhibit good gloss and brightness.

In one or more embodiments, excellent printing strength and greater porosity can be achieved with the latex compositions of the present invention, when compared to conventional carboxylated styrene-butadiene lattices. In certain embodiments, the bimodal latex gives low P&I slopes, indicating slower absorption of the offset ink vehicle into the sheet and a reduced rate of ink tack build. In one embodiment, the bimodal latex also provides more P&I passes to failure before coating pickout, which is important for printing performance. Additionally, the bimodal latex provides improved wet pick and ink receptivity in certain embodiments, particularly in coating formulations where low levels of starch are used as a co-binder.

In order to demonstrate the practice of the present invention, the following examples have been prepared and tested. The examples should not, however, be viewed as limiting the scope of the invention. The claims will serve to define the invention.

EXAMPLES

Example 1

Comparative SB Latex—Non-Polymodal

A carboxylated styrene-butadiene (SB) latex was prepared having a unimodal particle size distribution. The particles had a modal diameter of about 190±15 nm, as measured by CHDF. No attempt was made to create two distinct particle populations, i.e. by using a first and second seed, and therefore the polymer particles are believed to be fairly similar in composition. The polymer particles were characterized by an acid content of about 41.8 meq of carboxylic acid per 100 grams of dry polymer. The latex was characterized by a $T_g$ of 18° C., a gel content of 88%, a finished solids content of 50.5% at a pH adjusted to 6.5 with sodium hydroxide. Small amounts of biocide Proxel GXL and defoamer Drew L198 were added to the latex.

Example 2

Comparative SBA Latex—Non-Polymodal

A carboxylated non-polymodal styrene-butadiene-acrylonitrile (SBA) type latex was prepared having a unimodal particle size distribution. The particles had a modal diameter of about 120±15 nm, as measured by CHDF. No attempt was made to create two distinct particle populations, i.e. by using a first and second seed, and therefore the polymer particles are believed to be fairly similar in composition. The polymer particles were characterized by an acid content of about 49.3 meq of carboxylic acid per 100 grams of dry polymer. The latex was characterized by a $T_g$ of 8° C., a gel content of 75%, a finished solids content of 50.1% at a pH adjusted to 6.8 with sodium hydroxide. Small amounts of biocide Proxel GXL and defoamer Drew L198 were added to the latex.

Example 3

Bimodal SBA Latex

A bimodal latex in accordance with the present invention was synthesized in a 20 gallon reactor. A mixture of deionized water 7.97 kg, the surfactant Dowfax™ 2A1 (15%) 2.27 kg, the chelating agent Hampene™ NA3 (40%) 0.042 kg, and itaconic acid 4.37 kg was added to the reactor and then heated to 65° C. for 15 minutes. A 10% solution of sodium persulfate 1.52 kg in deionized water was then added to the reactor. After 10 minutes styrene 2.56 kg was added and allowed to react for 15 minutes. The surfactant Dowfax™ 2A1 (15%) 0.45 kg and deionized water 0.34 kg were added and reacted for 5 minutes. Then the following polymerizable mixtures identified in stages in Table 1 below were sequentially added every 25 minutes at 54° C.

TABLE I

|  | WEIGHT, kg |
|---|---|
| STAGE 1 | |
| acrylonitrile | 0.31 |
| styrene | 0.63 |
| dodecyl mercaptan | 0.023 |
| butadiene | 1.10 |
| STAGE 2 | |
| acrylonitrile | 0.31 |
| styrene | 0.63 |
| dodecyl mercaptan | 0.023 |
| butadiene | 1.10 |
| STAGE 3 | |
| acrylonitrile | 0.31 |
| styrene | 0.63 |
| dodecyl mercaptan | 0.023 |
| butadiene | 1.10 |

Deionized water 0.34 kg and the surfactant Dowfax™ 2A1 0.68 kg were added and allowed to react for 5 minutes. Then the following polymerizable mixtures identified in stages in Table 2 below were sequentially added every 25 minutes at 54° C.

TABLE II

|  | WEIGHT, kg |
|---|---|
| STAGE 4 | |
| acrylonitrile | 0.31 |
| styrene | 0.63 |
| dodecyl mercaptan | 0.023 |
| butadiene | 1.10 |
| STAGE 5 | |
| acrylonitrile | 0.31 |
| styrene | 0.63 |
| dodecyl mercaptan | 0.023 |
| butadiene | 1.10 |
| STAGE 6 | |
| acrylonitrile | 0.31 |
| styrene | 0.63 |

TABLE II-continued

| | WEIGHT, kg |
|---|---|
| dodecyl mercaptan | 0.023 |
| butadiene | 1.10 |

After the addition of the polymerizable mixture of Stage 6 to the reactor the mixture was reacted to about 29 to 33 wt % solids and then reseeded. In the reseeding stage a mixture of sodium dodecyl sulfate 2.41 kg, sodium persulfate 0.51 kg, styrene 1.19 kg and itaconic acid 2.16 kg was added to the reactor. The following polymerizable mixtures identified in stages in Table 3 below were then sequentially added to the reactor every 25 minutes.

TABLE III

| | Weight, kg |
|---|---|
| Stage 1 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Solution Charge | |
| deionized water | 0.68 |
| Dowfax 2A1 | 0.68 |
| Stage 2 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Stage 3 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Solution Charge | |
| deionized water | 0.68 |
| Dowfax 2A1 | 0.68 |
| Stage 4 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Solution Charge | |
| deionized water | 0.34 |
| Dowfax 2A1 | 0.57 |
| Stage 5 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Stage 6 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Stage 7 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |
| Stage 8 | |
| styrene | 0.65 |
| dodecyl mercaptan | 0.027 |
| butadiene | 1.10 |
| acrylic acid | 0.15 |
| deionized water | 0.17 |
| acrylonitrile | 0.31 |

The temperature was increased to about 76° C. and the polymerizable mixture was then reacted in the reactor until constant solids, about 120 minutes. The conversion of monomers to polymer was about 99% as determined by a total solids measurement.

Sodium hydroxide (13%) 2.27 kg, deionized water 0.68 kg, and sodium persulfate 0.68 kg, were added to the reactor and allowed to react for 30 minutes and then cooled to 32° C. and transferred to a stripping vessel and steam stripped and filtered in a conventional manner for approximately 3 hours or until the residual styrene monomer was 0.05 wt % or less. The bimodal latex was then cooled to 23° C. A biocide Kathon LX (3.5%) 0.4 kg, and a defoamer Drew L-198 0.045 kg were then added to the bimodal latex.

The latex was then filtered through a 325 mesh screen to remove small quantities of coagulum. The bimodal latex had a total solids content of about 50.0-52.0 wt %, and pH of about 6-7. The particle size distribution was measured by CHDF. Two modes were observed, with maxima at about 85.0 nm and about 161.2 nm. The smaller size particles were about 25% of the distribution on a weight basis and the larger size particles were about 75% on a weight basis. The bimodal latex had a gel content of about 77%. The bimodal latex contained about 63.9 meq carboxylic acid per 100 grams dried polymer, as measured by FTIR. The smaller particles contained about 51 meq carboxylic acid per 100 grams dried polymer, and the larger particles contained about 12.9 meq carboxylic acid per 100 grams dried polymer.

Examples 4-10

Coating Formulations

Several different paper coating formulations were prepared, using the comparative latex of Example 1, three different levels of the latex of Example 2, and three different levels of the bimodal latex of Example 3. More specifically, the coating formulation of Example 4 contains the latex of Example 1, the coating formulations of Examples 5-7 contain the latex of Example 2, and the coating formulations of Examples 8-10 contain the latex of Example 3. In addition to the latex, the coating formulations included mineral pigments, a dispersant, carboxymethyl cellulose thickener, modified starch co-binder, and calcium stearate lubricant. The coating formulations were prepared in standard mixers known in the art. The compositions of the dry solids of the paper coating formulations are provided in Table IV. The parts of all formulation components, except for the filler pigments clay, calcium carbonate and titanium dioxide are based on fractions of 100 parts of total dry solids of pigment.

TABLE IV

COATING TABLE

|  | 4 | 5 | 6 | 7 | 8 | 9 | 10 |
|---|---|---|---|---|---|---|---|
| Nuclay clay | 70 | 70 | 70 | 70 | 70 | 70 | 70 |
| HT clay | 20 | 20 | 20 | 20 | 20 | 20 | 20 |
| Hollow sphere pigment AF-1055 | 2 | 2 | 2 | 2 | 2 | 2 | 2 |
| Ansilex 93 clay | 5 | 5 | 5 | 5 | 5 | 5 | 5 |
| $TiO_2$ | 3 | 3 | 3 | 3 | 3 | 3 | 3 |
| Acumer 9300 polyacrylate | 0.2 | 0.2 | 0.2 | 0.2 | 0.2 | 0.2 | 0.2 |
| starch PG-280 | 5 | 5 | 5 | 5 | 5 | 5 | 5 |
| Sunrex 755 crosslinker | 0.15 | 0.15 | 0.15 | 0.15 | 0.15 | 0.15 | 0.15 |
| Sunkote 450 lubricant | 1 | 1 | 1 | 1 | 1 | 1 | 1 |
| OBA | 1 | 1 | 1 | 1 | 1 | 1 | 1 |
| Latex | 11 | 8 | 9.5 | 11 | 8 | 9.5 | 11 |
| Water | to 58% total dry solids | to 58% total dry solids | to 58% total dry solids | to 58% total dry solids | to 58% total dry solids | to 58% total dry solids | to 58% total dry solids |

Examples 11-17

The coating formulations of Examples 4-10 were neutralized to a pH of about 8.0-8.5 with sodium hydroxide and applied to different base sheets, corresponding to Examples 11-17 as shown in Table V. The coating equipment was a pilot plant blade coater, similar to the coating method used in commercial practice, but coating narrow webs (about 28 inches). The base uncoated paper was a commercially made typical light weight coated (LWC) paper with grammage (weight per unit area) of about 40 pounds per 3300 square feet. This is typical weight of coated magazine papers. The 6.0 pounds coating weight was applied onto one side of the paper with the blade coater running at 4000 fpm, representing commercial application conditions. The paper was coated with the formulation, then calendered offline in a pilot super-calender to a paper gbloss of 55% TAPPI Standard 75 degrees gloss.

The coated papers were subjected to a P&I Stability test on a flatbed Vandercook proofing press. The press has a flat, adjustable bed and a motorized printing cylinder that is covered with an offset blanket. After ink is applied to the blanket, the cylinder was moved forward on impression and over the paper sheet. As the inked blanket prints the paper sheet the force required to release the printed sheet from the blanket is measured. Without replenishing the ink film repeated prints are made and each time the release force is measured. This procedure simulates a paper printed with an ink in the first units of a press contacting subsequent blankets during multicolor printing. The slope of the line connecting the second and last passes is the rate at which an ink sets on a given substrate. The higher the slope the more absorbent the paper sheet is to ink oil/solvent and the higher the ink tack buildup. For example, traditionally an open porous coated sheet has a higher slope than a tight non-porous sheet. When the paper coating picks onto the blanket during the P&I Stability test, testing is stopped, and the number of passes is noted as Passes-to-Fail. Typically, paper sheets must withstand a minimum of 4 passes to resist printing press picking, piling and tail edge picking problems. For a more detailed discussion of the P&I Stability test reference is made to "Predicting print mottle: a method of differentiating between three types of mottle", 173-184, Vol. 77, No. 7 TAPPI Journal, Nancy Plowman Sandreuter, incorporated herein by reference.

In addition, the coating binding strength was determined by IGT Pick testing according to standard methods of measurement by the Technical Association of the Pulp and Paper Industry (TAPPI) as well known in the art. A measure of dry and wet binding strength is provided by IGT Pick testing pursuant to TAPPI Useful Method UM 591, Surface Strength of Paper. The IGT dry pick strength measures the speed, in cm/sec, required to lift the paper coating off of the surface of a paper strip when printed using an ink rolled and standard conditions as described in UM 591. Higher numbers indicate better resistance to picking when the paper is being commercially printed in an offset press. When the paper sample is being wetted with water prior to testing in the IGT tester the test is called the IGT Wet Pick. Prufbau Wet Pick is a well known procedure in the paper and printing industry developed by the manufacturer of the Prufbau laboratory printing press. Lower wet pick numbers indicate that it requires more force to lift off wetted coating, and generally, corresponds to high wet strength.

The coated papers were also evaluated for optical, strength and printing properties using standard methods of measurement by TAPPI. These tests include brightness (T452), and gloss (T480). Ink gloss was measured after printing the paper with a magenta heat set ink and taking three measurements to report the data at 1.6 ink density.

The polymer lattices in accordance with the present invention provide a unique balance of low slopes and high passes to fail. The results of the tests are provided in Table V.

TABLE V

|  | Test | | | | | | |
|---|---|---|---|---|---|---|---|
|  | 11 | 12 | 13 | 14 | 15 | 16 | 17 |
| Coating | 4 | 5 | 6 | 7 | 8 | 9 | 10 |
| Slope | 4.3 | 2.3 | 2.7 | 3.0 | 3.5 | 3.0 | 2.3 |
| Passes to Fail | 6 | 9 | 8 | 5 | 9 | 7 | 6 |
| Dry Pick | 11.47 | 16.77 | 14.28 | 10.65 | 11.96 | 15.77 | 14.81 |
| Paper Gloss | 42.6 | 47.0 | 44.4 | 46.7 | 40.8 | 43.4 | 45.2 |
| Brightness | 73.2 | 73.8 | 74.0 | 73.8 | 73.8 | 74.3 | 74.1 |
| Wet Pick | 6.5 | 3.3 | 4.8 | 6.5 | 5.8 | 5.0 | 5.5 |

Various modifications and alterations that do not depart from the scope and spirit of this invention will become apparent to those skilled in the art. This invention is not to be duly limited to the illustrative embodiments set forth herein.

The invention claimed is:

1. A latex comprising:
   a plurality of polymeric particles, where the particles include from about 50 to about 90 weight percent of particle population A and from about 10 to about 50 weight percent of particle population B, based upon the total weight of particles, where at least one of (i) particle population A and (ii) particle population B is derived from monomers comprising styrene, butadiene, and itaconic acid, where the particles of population A have a particle size of greater than 120 nanometers, and the particles of population B have a particle size of less than 120 nanometers, where at least some of the polymer particles contain acid functionality, and where the milliequivalents of acid functionality per 100 grams of population B is greater than the milliequivalents of acid functionality per 100 grams of population A.

2. The latex composition of claim 1, where the ratio of the milliequivalents of acid functionality per 100 grams of population A to the milliequivalents of acid functionality per 100 grams of population B is from about 1:1.5 to about 1:10.

3. The latex composition of claim 1, where the ratio of the milliequivalents of acid functionality per 100 grams of population A to the milliequivalents of acid functionality per 100 grams of population B is from about 1:2 to about 1:8.

4. The latex composition of claim 1, where the polymer particles are derived from an aliphatic conjugated diene monomer, an acid-bearing monomer, an alkenyl aromatic monomer, and optionally an ester, amide or nitrile derivative of an ethylenically unsaturated carboxylic acid.

5. The latex composition of claim 1, where particle population B is prepared in the presence of particle population A.

6. The latex composition of claim 1, where particle population A is derived from monomers comprising styrene, butadiene, and itaconic acid.

7. The latex composition of claim 1, where particle population A is derived from monomers comprising styrene, butadiene, acrylonitrile, and itaconic acid.

8. The latex composition of claim 1, where particle population B is derived from monomers comprising styrene, butadiene, acrylic acid, and itaconic acid.

9. The latex composition of claim 1, where particle population B is derived from monomers comprising styrene, butadiene, acrylic acid, acrylonitrile, and itaconic acid.

10. The latex composition of claim 1, where the latex further comprises a surfactant.

11. The latex composition of claim 1, where the latex contains less than 55 weight percent polymeric solids.

12. The latex composition of claim 1, where the modal diameter of particle population A is from about 120 to about 200 nanometers.

13. The latex composition of claim 1, where the modal diameter of particle population B is from about 50 to about 115 nanometers.

14. The latex composition of claim 1, where the acid content of population A to population B is at least 1:1.5.

15. The latex composition of claim 1, where the acid content of population A to population B is from about 1:3 to about 1:5.

16. A coating composition comprising:
   a latex, the latex including a plurality of polymeric particles, where the particles include from about 50 to about 90 weight percent of particle population A and from about 10 to about 50 weight percent of particle population B, based upon the total weight of particles, where at least one of (i) particle population A and (ii) particle population B is derived from monomers comprising styrene, butadiene, and itaconic acid, where the particles of population A have a particle size of greater than 120 nanometers, and the particles of population B have a particle size of less than 120 nanometers, where at least some of the polymer particles contain acid functionality, and where the milliequivalents of acid functionality per 100 grams of population B is greater than the milliequivalents of acid functionality per 100 grams of population A; and
   a finely divided mineral filler, where the coating composition includes from about 40 to about 70 percent solid by weight.

17. The coating composition of claim 16, where the coating includes latex particles in an amount of from about 2 to about 25 parts by weight of bimodal latex per 100 parts filler.

18. The coating composition of claim 16, where filler includes kaolin clay, satin white, calcium carbonate, titanium oxide, or combinations thereof.

19. The coating composition of claim 16, where particle population A is derived from monomers comprising styrene, butadiene, and itaconic acid.

20. The coating composition of claim 16, where the coating composition further includes one or more co-binders, thickeners, cross-linking agents, stabilizers, anti-foaming agents, surfactants, and water retention aids.

21. The coating composition of claim 16, where at least one of the polymer particles are derived from an aliphatic conjugated diene monomer, an acid-bearing monomer, an alkenyl aromatic monomer, and a nitrile derivative of an ethylenically unsaturated carboxylic acid.

* * * * *

UNITED STATES PATENT AND TRADEMARK OFFICE
CERTIFICATE OF CORRECTION

PATENT NO. : 7,629,410 B2　　　　　　　　　　　　　　　　　　　　　　　Page 1 of 1
APPLICATION NO. : 11/352786
DATED : December 8, 2009
INVENTOR(S) : Westerman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 605 days.

Signed and Sealed this

Twenty-first Day of December, 2010

David J. Kappos
*Director of the United States Patent and Trademark Office*